(12) United States Patent
Resta et al.

(10) Patent No.: US 10,271,662 B2
(45) Date of Patent: Apr. 30, 2019

(54) STATION FOR DETECTING, CONTROLLING, CHECKING AND COMPARING PHYSICAL PARAMETERS OF A MATTRESS, A PILLOW AND THE LIKE

(71) Applicant: RESTA S.R.L., Faenza (IT)

(72) Inventors: Paolo Resta, Faenza (IT); Roberto Resta, Faenza (IT)

(73) Assignee: RESTA S.R.L., Faenza (IT)

( * ) Notice: Subject to any disclaimer, the term of this patent is extended or adjusted under 35 U.S.C. 154(b) by 2 days.

(21) Appl. No.: 15/795,022

(22) Filed: Oct. 26, 2017

(65) Prior Publication Data

US 2018/0116422 A1 May 3, 2018

(30) Foreign Application Priority Data

Oct. 27, 2016 (IT) .................. 102016000108392

(51) Int. Cl.
| | |
|---|---|
| *G01N 21/00* | (2006.01) |
| *A47C 31/12* | (2006.01) |
| *A47C 27/14* | (2006.01) |
| *G01B 11/04* | (2006.01) |
| *G01B 21/02* | (2006.01) |
| *B29C 44/56* | (2006.01) |
| *B29L 31/00* | (2006.01) |

(52) U.S. Cl.
CPC .......... *A47C 31/123* (2013.01); *A47C 27/148* (2013.01); *G01B 11/043* (2013.01); *G01B 11/046* (2013.01); *G01B 21/02* (2013.01); *B29C 44/5627* (2013.01); *B29K 2995/0063* (2013.01); *B29L 2031/751* (2013.01)

(58) Field of Classification Search
CPC ... A47C 31/123; A47C 27/148; G01B 11/043; G01B 11/046; G01B 21/02; G01B 5/26; G01B 11/00; G01B 11/14; G01B 11/25; G01B 11/02; G01B 11/06; G01B 21/04; G01B 17/00; H04N 13/02; G01G 19/00
See application file for complete search history.

(56) References Cited

U.S. PATENT DOCUMENTS

| | | | |
|---|---|---|---|
| 2,689,082 A | 9/1954 | Kolisch | |
| 5,606,534 A | 2/1997 | Stringer et al. | |
| 6,850,464 B2 * | 2/2005 | Carlsruh | ............. G01B 11/026 367/99 |
| 2012/0200862 A1 | 8/2012 | Kennington et al. | |

FOREIGN PATENT DOCUMENTS

WO 2010033895 A2 3/2010

* cited by examiner

*Primary Examiner* — Abdullahi Nur
(74) *Attorney, Agent, or Firm* — Cantor Colburn LLP

(57) ABSTRACT

A station for detecting, controlling, checking, and comparing physical parameters of a mattress or a pillow, includes a retention frame for a resting surface, designed to support the mattress or the pillow. The resting surface, at one of its corners, includes respective abutment walls for concurrent side faces of the mattress or the pillow. The frame also supports at least one rangefinder which is aligned with at least one face of the mattress or the pillow that lies opposite the respective faces that rest on the resting surface and against the walls.

10 Claims, 5 Drawing Sheets

STATION FOR DETECTING, CONTROLLING, CHECKING AND COMPARING PHYSICAL PARAMETERS OF A MATTRESS, A PILLOW AND THE LIKE

CROSS REFERENCE TO RELATED APPLICATIONS

This application is related to and claims the benefits of Italian Patent Application No. 102016000108392, filed on Oct. 27, 2016, the contents of which are herein incorporated by reference in their entirety.

TECHNICAL FIELD

The present disclosure relates to a station for detecting, controlling, checking and comparing physical parameters of a mattress, a pillow and the like.

BACKGROUND

The industrial production processes adopted to make mattresses, pillows (including for sofas and furniture) and the like are affected by an intrinsic imprecision, in terms of the geometric and structural parameters of the mattresses produced, owing to the often-inconstant characteristics of the raw materials and to their easy deformability.

The result therefore is that the mattresses put on the market differ in the quality of materials, and the dimensions, in particular the dimensions between one product and the next (even of the same item of merchandise), can differ by some centimeters.

Such differences can be caused by a low standard of quality of the raw materials and of the work carried out, but (increasingly frequently) they can be required in order to conform to the increasingly intense demand for non-standard products (i.e. made to measure).

Therefore it is very difficult to discriminate and distinguish mattresses that have different measurements, even with the trained eye of a specialist technician.

At the same time, it is equally important to check the effective measurements of the mattress produced, in order to be certain of miming up a product that conforms to the specifications.

This check is usually carried out manually by staff who use instruments such as flexometers or rangefinders, or metric straps and the like.

Obviously an accurate size assessment requires time and precision: carrying out a manual assessment therefore impacts on the final cost of the product.

Furthermore, the quality of the manual assessment is linked to the expertise of the technician and therefore the technician might not ensure the desired precision and uniformity, over time, of the measurements (if the technician changes, or if the same technician changes their attention span while carrying out their duties).

SUMMARY

The aim of the present disclosure is to solve the above mentioned drawbacks, by providing a station for detecting, controlling, checking and comparing physical parameters of a mattress, a pillow and the like, which enables the automatic checking of the geometric dimensional and structural parameters of a mattress, pillow and the like arranged on it.

Within this aim, the disclosure provides a station for detecting, controlling, checking and comparing physical parameters of a mattress, a pillow and the like, which makes it possible to carry out rapid and simple assessments, and which therefore does not result in a significant increase in the costs of the product in question.

The disclosure also provides a station for detecting, controlling, checking and comparing physical parameters of a mattress, a pillow and the like, which can create data strings to identify each mattress, pillow and the like that is examined, for a subsequent comparison thereof with the design data (and/or with the commissioning data and/or with the order data).

The present disclosure further provides a station for detecting, controlling, checking and comparing physical parameters of a mattress, a pillow and the like, which is low cost, easily and practically implemented and safe in use.

These advantages and features which will become better apparent hereinafter are achieved by providing a station for detecting, controlling, checking and comparing physical parameters of a mattress, a pillow and the like, characterized in that it comprises a retention frame for a resting surface, designed to support the mattress, the pillow and the like, said surface, at one of its corners, comprising respective abutment walls for concurrent side faces of the mattress, pillow and the like, said frame also supporting at least one rangefinder which is aligned with at least one face of said mattress, pillow and the like that lies opposite the respective faces that rest on the surface and against said walls.

BRIEF DESCRIPTION OF THE DRAWINGS

Further characteristics and advantages of the disclosure will become better apparent from the detailed description that follows of a preferred, but not exclusive, embodiment of the station for detecting, controlling, checking and comparing physical parameters of a mattress, a pillow and the like according to the disclosure, which is illustrated by way of non-limiting example in the accompanying drawings, wherein.

DETAILED DESCRIPTION OF THE DRAWINGS

Figure 1:
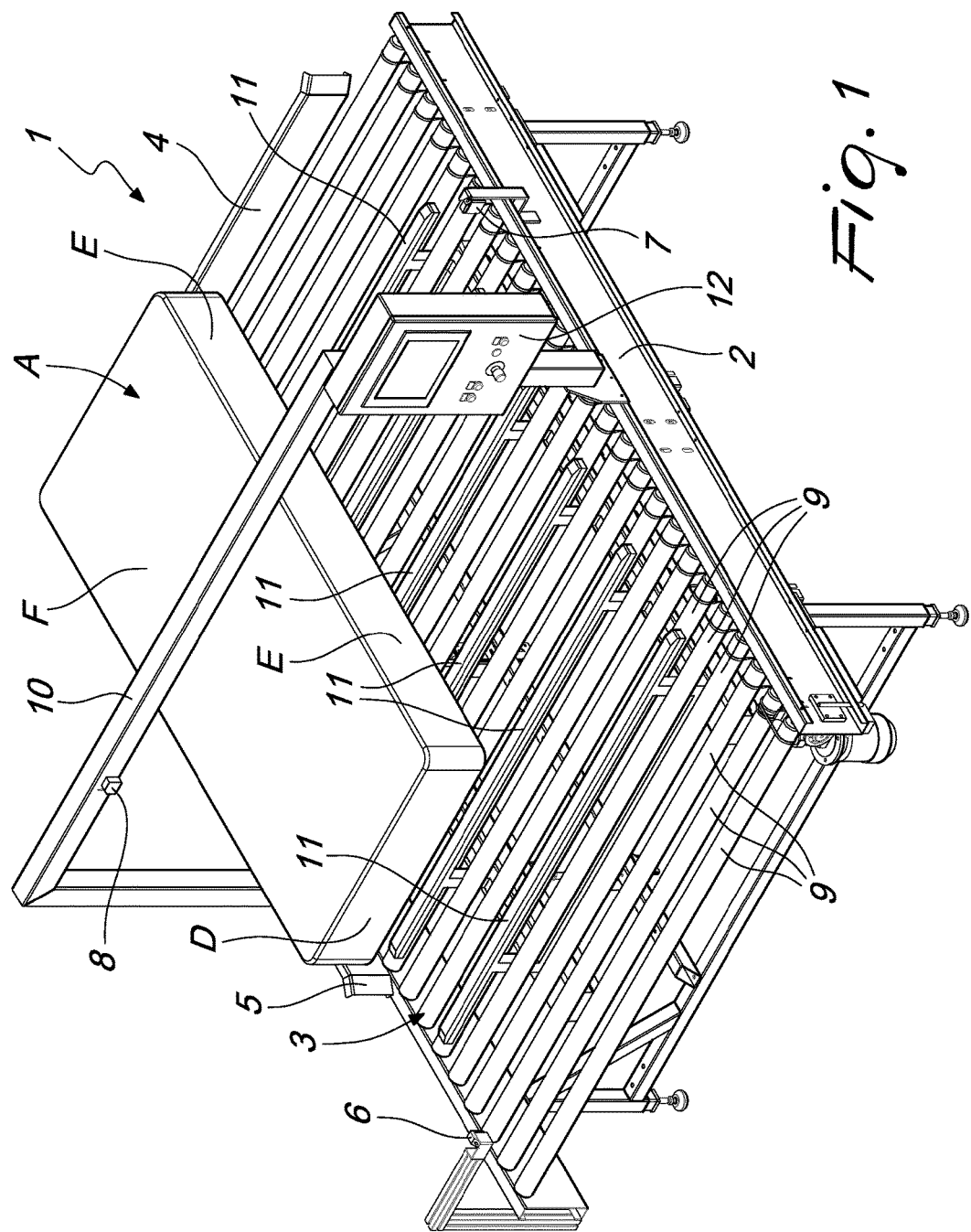
FIG. 1 is a perspective view of a station for detecting physical parameters of a mattress, a pillow and the like according to the disclosure.
Figure 2:
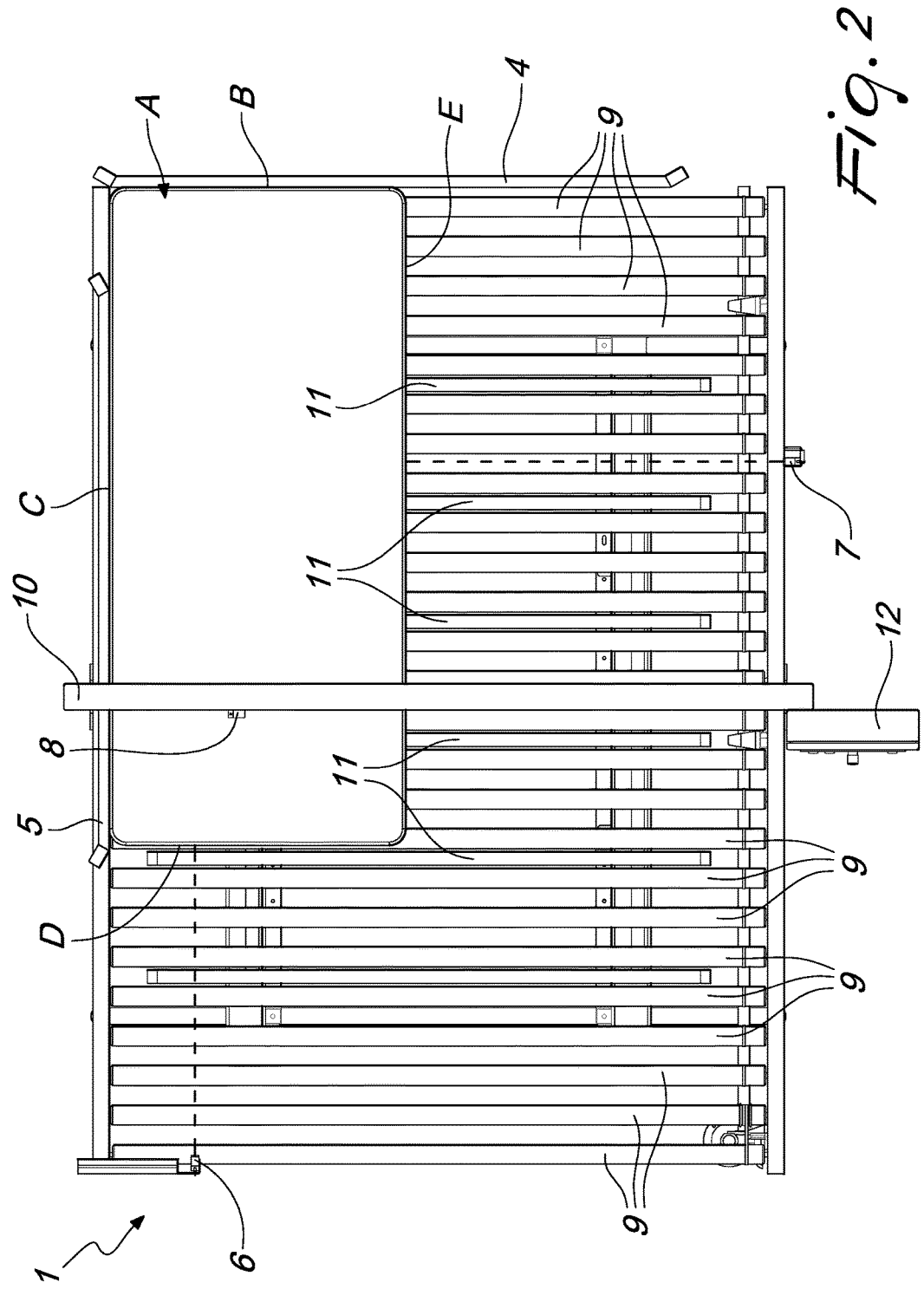
FIG. 2 is a view from above of the station in FIG. 1.
Figure 3:
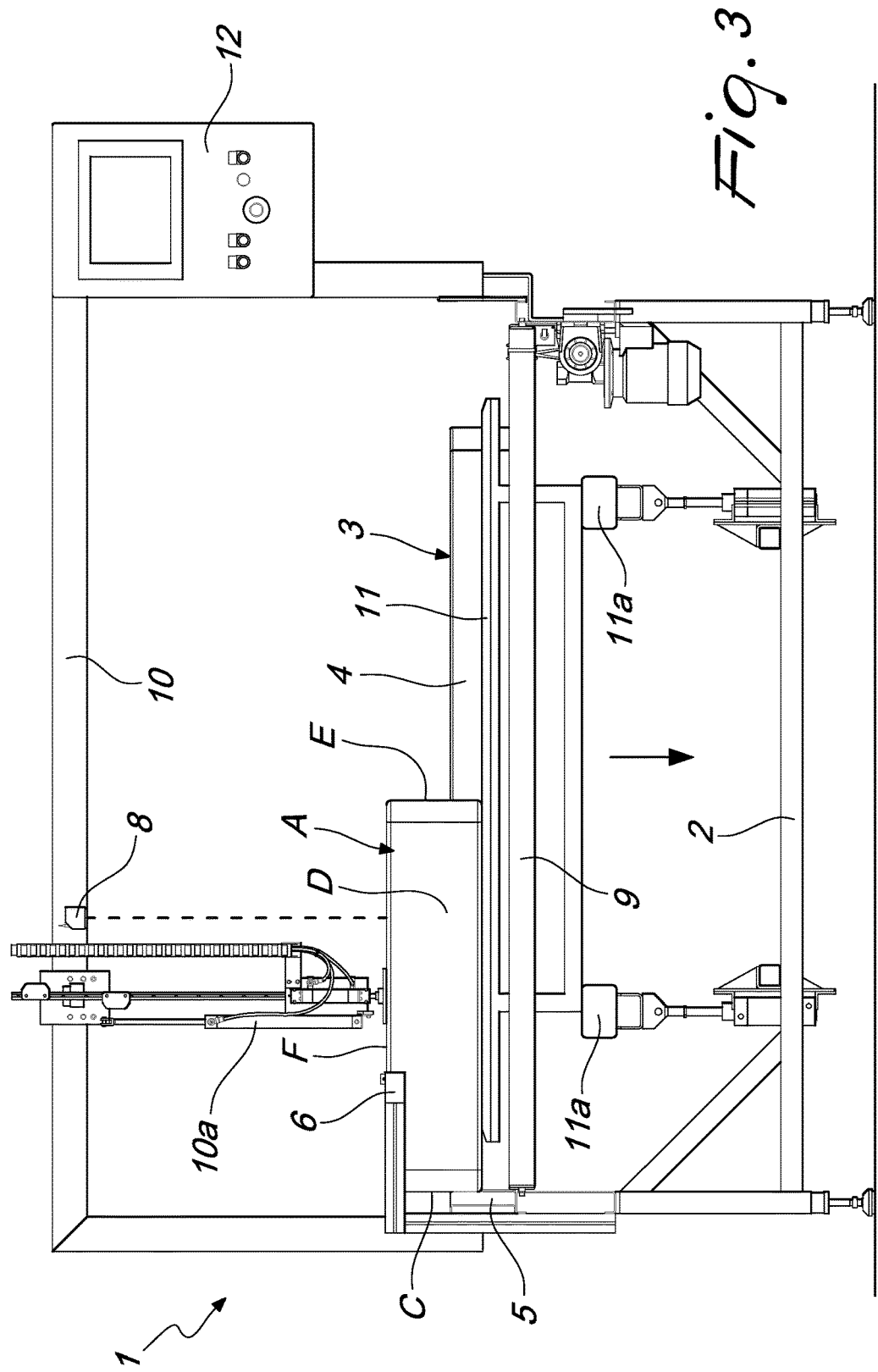
FIG. 3 is a front elevation view of the station in FIG. 1.
Figure 4:
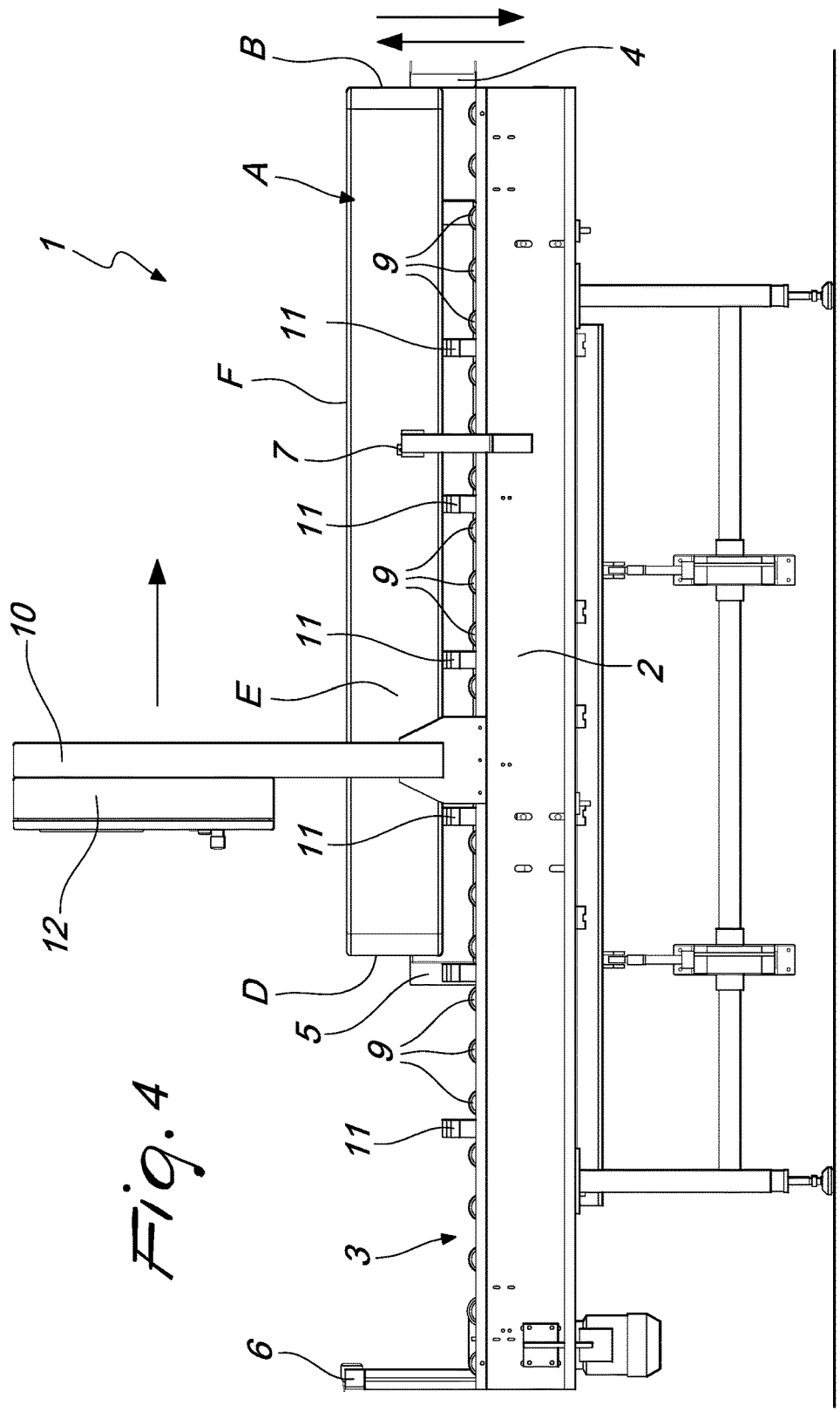
FIG. 4 is a side view of the station in FIG. 1.
Figure 5:
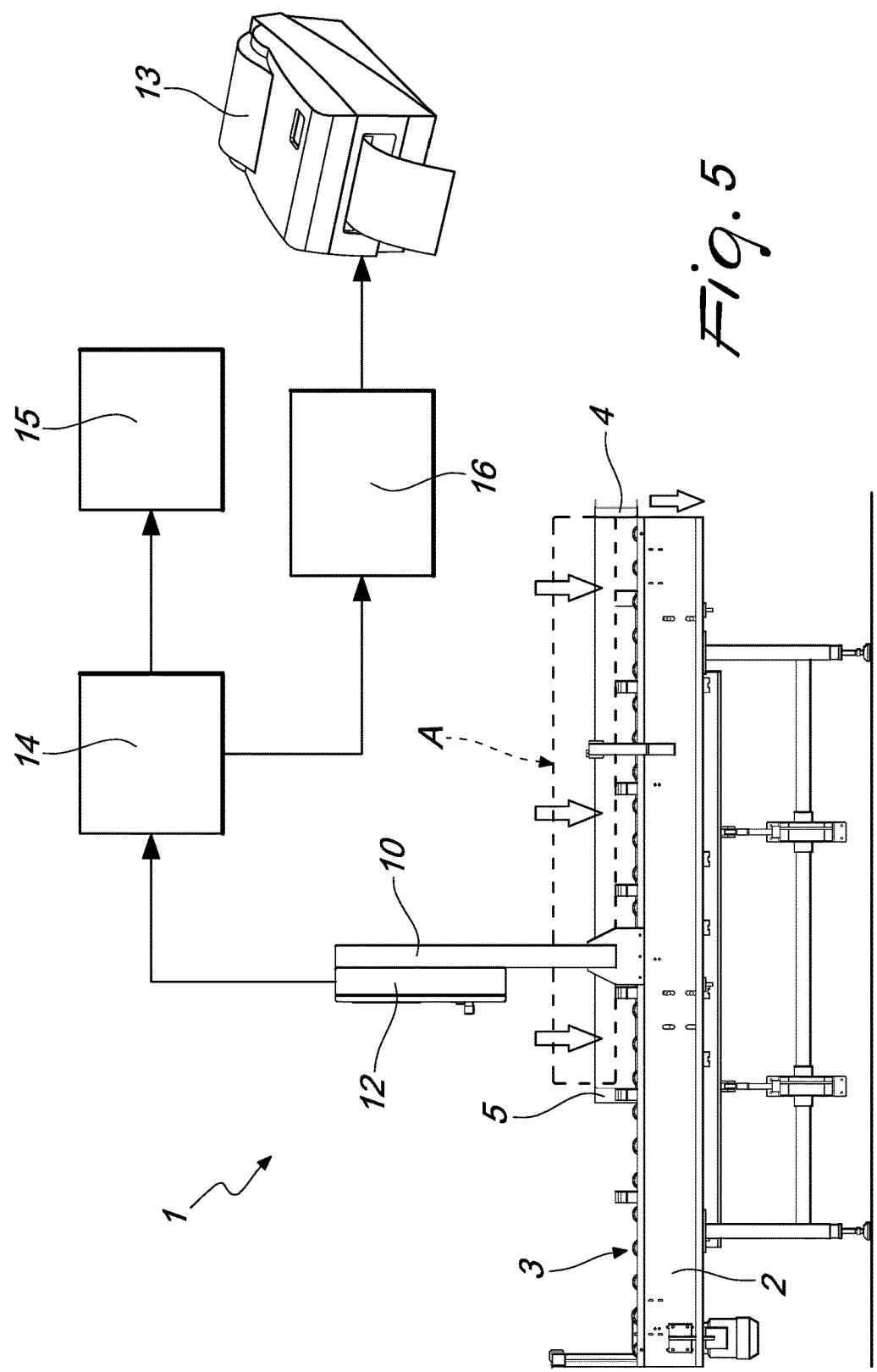
FIG. 5 is a functional block diagram of the station according to the disclosure.

With reference to FIGS. 1-5, the reference numeral 1 generally designates a station for detecting, controlling, checking and comparing physical parameters of a mattress A, a pillow and the like.

The station 1 comprises a retention frame 2 for a resting surface 3, designed to support the mattress A, the pillow and the like.

The resting surface 3, at one of its corners, comprises respective abutment walls 4, 5 for concurrent side faces B, C of the mattress A, pillow and the like.

The frame 2 also supports at least one rangefinder 6, 7, 8 which is aligned with at least one face (respectively D, E and F) of the mattress A, pillow and the like, that lies opposite the respective faces that rest on the surface 3 and against the walls 4, 5.

According to a specific embodiment of undoubted practical and applicative interest, the resting surface 3 is constituted by a roller conveyor.

The possibility of providing the resting surface 3 by way of a conveyor belt is not ruled out.

With particular reference to such embodiment, it should be noted that at least one of the rollers 9 of the cited roller conveyor is motorized for the entrainment of the mattress A, pillow and the like up to the corresponding abutment against the walls 4, 5.

When the mattress A, pillow and the like has its faces B and C resting against the walls 4 and 5, it is possible to carry out the measuring thereof such arrangement is therefore defined in brief as the "arrangement for the measurement of the mattress A, pillow and the like".

It should be noted that, in order to ensure a complete identification of the dimensions of the mattress A, pillow and the like, it is advisable to have three rangefinders 6, 7 and 8, directed along three perpendicular directions.

A first direction of detection of a first rangefinder 6 will positively be parallel to the longitudinal axis of the mattress A, pillow and the like in order to detect the respective length; a second direction of detection of a second rangefinder 7 will positively be parallel to the corresponding transverse axis for the detection of the width of the mattress A, pillow and the like; a third direction of detection of a third rangefinder 8 will conveniently be perpendicular to the first two, for the detection of the thickness of the mattress A, pillow and the like.

The rangefinder is an instrument, originally optical, that can measure the distance between the point of detection and any point of the field of view.

In the present discussion, the rangefinder can be constituted by any device capable of measuring a distance (in particular the distance between the detection surface and the surface facing it of the mattress A, pillow and the like) and it can therefore also be constituted by TOF (Time Of Flight) detectors, optical detectors, laser detectors, ultrasound detectors, infrared detectors and the like.

In order to enable the acquisition of a larger amount of information by virtue of the station 1 according to the disclosure, at least one load cell is interposed between the frame 2 and at least one portion of the resting surface 3, for detecting the weight of the mattress A, pillow and the like in a specific arrangement thereof on the resting surface 3, in alignment with the aforementioned portion.

It should further be noted that the frame 2 further comprises an arch 10 that surmounts the resting surface 3.

Depending on the specific embodiment chosen, the arch 10 will accommodate at least one component chosen from between at least one rangefinder 8 and at least one probe 10*a*.

The probe 10*a* in particular will positively be provided with an end that can move between a first configuration of no interference with the mattress A, pillow and the like, which is arranged on the resting surface 3, and a configuration of maximum interference with it.

In essence, the movable end of the probe 10*a* can exert a pressure on the surface F of the mattress A, pillow and the like, causing a deformation thereof with consequent identification of the aptitude to deformation of the mattress A, pillow and the like and also of the progression of the deformation itself as a function of the pressure applied by the end of the probe 10*a*.

It should be noted that, in order to ensure maximum efficiency and optimal capacity for detection of the pressure exerted, the probe 10*a* can advantageously comprise at least one sensor for detecting the pressure applied at the various deformations induced in the mattress A, pillow and the like, between the configuration of first contact (in which the pressure applied is still nil) of the end of the probe 10*a* with the surface of the mattress, pillow and the like, and the configuration of maximum interference thereof with it (in which the pressure applied will reach the maximum value).

It should be noted that the probe 10*a* can be constituted by a fluid-operated piston.

In particular, two pneumatic pistons could be used: a first piston will be designed to move an abutment plate until it is positioned on the upper surface of the mattress A, pillow and the like, a second piston will compress the mattress A, pillow and the like (making it possible therefore to detect its elastic response, its softness and its deformability).

The possibility of using other types of actuators is not ruled out in order to ensure the movement and application of pressure of the end of the probe 10*a*, according to the specific implementation requirements.

It should further be noted that the portion of the resting surface 3 that rests on at least one load cell can positively be moved and is constituted by a plurality of skids 11, which are interposed between contiguous rollers 9 of the roller conveyor.

The skids 11 will be arranged at a lower level than the level of the upper portion of the side surface of the rollers 9 in an inactive configuration, while the skids 11 will be conveniently arranged at a higher level than the level of the upper portion of the side surface of the rollers 9 in a weighing configuration, in which the mattress A, pillow and the like rests exclusively on the skids 11 proper, thus being raised with respect to the roller conveyor.

In such case the load cell 11*a* will be interposed between the actuators that will enable the movement of the skids 11 and the skids 11 proper.

It should be noted that, during the operation, the probe 10*a* will press on the mattress A, pillow and the like while the latter presses on the load cell 11*a* (i.e. while the skids 11 are raised with respect to the surface 3).

In this way, upon performing a predefined descent stroke (predefined with respect to the rest position in which the abutment plate of the probe 10*a* rests without applying any pressure on the upper surface F of the mattress A, pillow and the like) of the plate of the probe 10*a*, the load cell 11*a* will detect an increase in thrust (given by the sum of the weight of the mattress A, pillow and the like and of the pressure applied by the probe 10*a*): by measuring the difference (with respect to the weight of the mattress A, pillow and the like on its own), the value of the pressure applied by the probe 10*a* in order to generate a deformation of the preset stroke can therefore be calculated.

The disclosure described up to now is, in a particularly efficient version thereof, constituted by a roller conveyor, optionally motorized, that can be mounted in a production line and is provided with three photocells (which constitute the rangefinders 6, 7 and 8) that are capable of detecting the effective dimensions of the product (mattress A, pillow and the like) that is arranged on it.

In order to ensure that the measurements are precise and correctly replicable, the roller conveyor comprises the walls 4 and 5 (which can be fixed or movable depending on the specific implementation requirements) which are arranged at a corner region of that roller conveyor.

The mattress A (or the pillow or the like) can be pushed against the walls 4, 5 manually or automatically.

Once the mattress A (or the pillow or the like) has reached the resting configuration against the walls of the respective faces B and C, the photocells (rangefinders 6, 7 and 8) read their distance from the mattress A (or pillow or the like): by subtracting the measured value from the known distance between each wall 4, 5 (or the surface 3 on which the product rests on the roller conveyor) and photocell (respectively the rangefinders 6, 7 and 8), a corresponding dimension of the product (mattress A, pillow and the like) is obtained. This method makes it possible to detect the three characteristic dimensions (since the product is regular in shape, these measurements are sufficient to geometrically identify it): length, width, and height.

It should be noted that, with the presence of skids 11 that rest on a load cell (which in turn rests on the frame 2), the possibility exists of raising the product (mattress A, pillow and the like) and detecting its weight.

By way of a control and management unit 12 (which can also comprise a display and an interface for the operators) the station 1 can also process the data detected and obtain another important data item, which is the density of the product (kg/m$^3$): in essence the unit 12, once the dimensions are known, will calculate the volume of the product (mattress A, pillow and the like) and will divide the corresponding measured weight by the calculated volume (in order to obtain the density).

The probe 10a will further make it possible to measure values typical of the type of products in question (i.e. mattresses A, pillows and the like), in particular their softness, deformability, and elastic response to stresses. The probe could also be constituted by an arm actuated by a pneumatic jack.

All the data detected could positively be processed and sent to a printer 13 which will print a codified label (QR code, bar code, RFID tag) that will refer to the data detected.

The station 1 according to the disclosure can be arranged in a production line and used as an assembly to control and verify the quality of the products produced. In such case the walls 4 and 5 can be raised and lowered in order to allow the mattress A (or of the pillow or the like) to be locked in place for only the time necessary to carry out the assessment and the measurements: the walls 4, 5 will in fact usually be lowered in order to allow the mattress A (pillow and the like) to pass through the station 1 during the corresponding production process.

In essence, the station 1 will carry out the assessments and will make them available for a comparison in a given step 14 of operation.

The validation of the mattress A, pillow and the like can be performed by the operator (in a possible step 15), after having verified the correspondence of the data detected in step 14 with the commissioning data (or the order data, or the design data): in particular the mattresses A, pillows and the like that fall within a predefined range in the neighborhood of the ideal measurements will be considered valid.

As an alternative, it is the station 1 itself (more precisely the unit 12) that executes the comparison (step 16) of the data detected with the ideal data (corresponding to the order, to the design data and/or to the commissioning data), subsequently proceeding to print a corresponding label that certifies the compliance. If the data detected do not correspond to the ideal data, a message will be issued of "non-conformance" of the mattress A, pillow and the like, which will therefore be discarded (and/or modified).

Advantageously the present disclosure solves the above mentioned drawbacks, by providing a station 1 for detecting, controlling, checking and comparing physical parameters of a mattress A, a pillow and the like, which enables the automatic checking of the geometric dimensional and structural parameters of a mattress A, pillow and the like arranged on it.

Positively the station 1 according to the disclosure makes it possible to carry out rapid and simple assessments, which therefore do not result in a significant increase in the costs of the product in question (increases that are usually inevitable with the complex manual measurements carried out in the known art).

Positively the station 1 according to the disclosure is able to create data strings to identify each mattress, pillow and the like that is examined, for a subsequent comparison thereof with the design data (and/or with the commissioning data and/or with the order data).

Conveniently the station 1 for detecting, controlling, checking and comparing physical parameters of a mattress A, a pillow and the like is easily and practically implemented and is low cost: such characteristics render the station 1 according to the disclosure an innovation that is certain to be of practical application.

The disclosure, thus conceived, is susceptible of numerous modifications and variations. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The invention claimed is:

1. A station for detecting, controlling, checking, and comparing physical parameters of a mattress or a pillow, the station comprising a retention frame for a resting surface configured to support the mattress or the pillow, said resting surface, at one of its corners, comprising respective abutment walls for concurrent side faces of the mattress or the pillow, said frame also supporting at least one rangefinder aligned with at least one face of said mattress or said pillow that lies opposite the respective faces that rest on the resting surface and against said walls.

2. The station according to claim 1, wherein said resting surface is preferably chosen from between a roller conveyor and a conveyor belt.

3. The station according to claim 2, wherein at least one of the rollers of said roller conveyor is motorized for the entrainment of said mattress or said pillow up to the corresponding abutment against said walls, in the arrangement for measuring the mattress or the pillow.

4. The station according to claim 1, wherein said rangefinders are three in number, directed along three perpendicular directions, a first direction being parallel to the longitudinal axis of the mattress or the pillow in order to detect the respective length, a second direction being parallel to the corresponding transverse axis for the detection of the width, and a third direction being perpendicular to the first two for the detection of the thickness.

5. The station according to claim 1, wherein at least one load cell is interposed between said frame and at least one portion of said resting surface for detecting the weight of the mattress or the pillow in a specific arrangement thereof on said resting surface, in alignment with said portion.

6. The station according to claim 1, wherein said frame comprises an arch that surmounts said resting surface, said arch accommodating at least one component chosen from between at least one rangefinder and at least one probe, said probe being provided with an end that can move between a first configuration of no interference with the mattress or the pillow, arranged on the resting surface, and a configuration of maximum interference with the mattress or the pillow.

7. The station according to claim 6, wherein said probe comprises at least one sensor for detecting the pressure applied at the various deformations induced in the mattress or the pillow between the configuration of first contact of the end of the probe with the resting surface of said mattress or said pillow and said configuration of maximum interference thereof with the mattress or the pillow.

8. The station according to claim 7, wherein said probe is constituted by a fluid-operated piston.

9. The station according to claim 5, wherein said portion of said resting surface that rests on at least one load cell is movable and is constituted by a plurality of skids, which are interposed between contiguous rollers of said roller conveyor, said skids being arranged at a lower level than the level of the upper portion of the side surface of the rollers in an inactive configuration and being arranged at a higher level than the level of the upper portion of the side surface of the rollers in a weighing configuration in which the mattress or the pillow rests exclusively on said skids, the mattress or the pillow being raised with respect to said roller conveyor.

10. The station according to claim 1, wherein said abutment walls are movable between a configuration of interference with the mattress or the pillow arranged on the resting surface, and corresponding immobilization, and a retracted configuration, in which they do not protrude with respect to the resting surface, thus not interfering with the travel of the mattress or the pillow.

\* \* \* \* \*